United States Patent Office 3,236,884
Patented Feb. 22, 1966

---

3,236,884
N-METHYL GLYCINE DERIVATIVE OF TRICHLOROPHENOL
Charles F. Geschickter, Kensington, and Ebenezer Emmet Reid, Baltimore, Md., and Jacob R. Meadow, Lexington, Ky., assignors to The Geschickter Fund for Medical Research, Inc., Washington, D.C., a corporation of New York
No Drawing. Filed Apr. 19, 1961, Ser. No. 103,961
1 Claim. (Cl. 260—519)

This application is a continuation-in-part of applicants' copending application Serial No. 595,609, filed July 3, 1956, and now abandoned.

The present invention relates to novel compositions of matter and more particularly to N-methyl glycine derivatives of phenols and phenol derivatives.

The antiseptic properties of phenols and phenol derivatives including thymol, cresol, naphthol and other substituted phenols are well known. Halogenation greatly increases the antiseptic action of these compounds so that in some instances, such as in the case of pentachlorophenol, the antiseptic action is increased as much as 50 times over that of simple phenols.

While phenols and phenol derivatives such as thymols, cresols and naphthols have a strong antiseptic action, however, they are so highly toxic that their use is quite limited.

It has been found that when N-methyl glycine (commonly known as "sarcosine") derivatives of these compounds are formed by the Mannich reaction, the toxicity is greatly reduced and the resulting derivatives are potent and useful antibiotic agents. Because of their low toxicity and high antibiotic potency, they may be used in relatively crude form for applications such as the sterilization of clothing, houses, and the like.

In addition to the feature of the present invention relating to the reduction in toxicity of phenols, another important aspect of the present invention relates to the formulation of a class of antiseptic-antibiotics through the substitution on the phenolic benzoid nucleus of a Manniched N-methyl glycine radical. More specifically, this aspect of the invention makes possible the use of antiseptic compounds as antibiotics through the Manniching of one or more N-methyl glycine substituents on the phenolic benzoid nucleus, whereby the antiseptic is imparted the additional quality of being a food substance for living organisms.

Any substituted or halogenated phenol or phenol derivative and dihydric and trihydric phenols may be used in forming N-methyl glycine derivatives of the present invention so long as either the ortho or para poistions or both are open.

Generally speaking, the present invention is directed to compounds of the formula

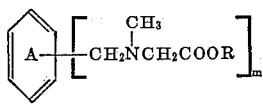

wherein $m$ is 1–2;

is a phenolic nucleus; R is selected from the group consisting of hydrogen, methyl, ethyl, ammonium and non-toxic basic metal atoms; and the

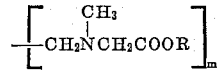

substituent is positioned either ortho or para to the phenolic hydroxyl radical when $m=1$ and in both of these positions when $m=2$.

The present invention is also directed to the following specific compounds:

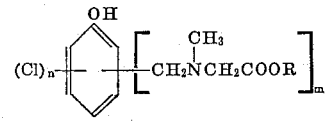
(1)

wherein $m$ is 1–2; $n$ is 1–4; R is selected from the group consisting of hydrogen, methyl, ethyl, ammonium and non-toxic basic metal atoms; and the

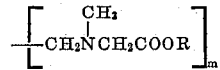

substituent is positioned either ortho or para to the OH radical when $m=1$ and in both of these positions when $m=2$;

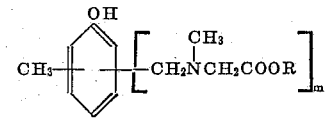
(2)

wherein $m$ and R have the significance set forth in Formula 1 and the

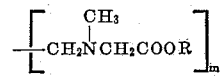

substituent is positioned as set forth in Formula 1; and

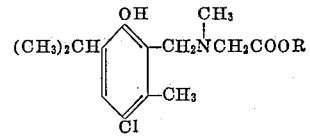

wherein R has the significance set forth in Formula 1.

Examples of the non-toxic basic metal atoms which R may represent in all of the compounds of the present invention are sodium, potassium, copper, iron, silver, etc.

Following are examples of the preparation of compounds embraced by the present invention:

EXAMPLE 1

*The N-methyl glycine (sarcosine) derivative of 2,4,5-trichlorophenol*

2,4,5-trichlorophenol, 1.5 g. (0.01 mole), was dissolved in 10 ml. of 95% ethanol and 21.4 g. of 13% aqueous solution of sodium sarcosinate (0.025 mole) were added. The reaction mixture was cooled in an ice bath and 3.1 g. (0.02 mole) of 37% aqueous formaldehyde were added. The solution was allowed to stand for one hour at room temperature and then heated under reflux for five hours.

The reaction is indicated by the following equation:

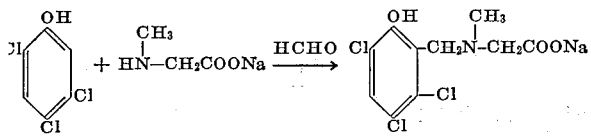

At this stage, the liquid contains excess N-methyl glycine and formaldehyde but these impurities can be tolerated for many uses, such as sterilizing clothing. When the compound is to be used in this form, it is usually preferable to use the bare minimum of formaldehyde necessary for the reaction and to use only a small (about 10% mol.) excess of N-methyl glycine.

To purify the compound further, concentrated HCl was added to about pH 3 and the reaction mixture concentrated to about 15 ml. and chilled. This step is shown by the following equation:

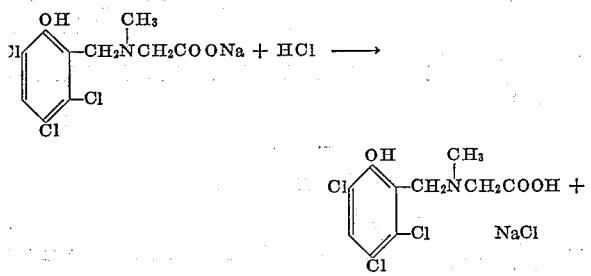

The mother liquor was decanted or filtered from the precipitate which formed and the precipitate may be treated with 15 ml. of 95% ethanol to induce crystallization. This solid was then recrystallized from 95% ethanol to give 1.0 g. (33%) tan crystals, M.P. 184° dec. (when placed on a melting point block at 175°). Additional product may be obtained by further concentrating the mother liquor.

A large scale run with 0.12 mole of the trichlorophenol, using solid trioxymethylene instead of aqueous HCHO, gave a similar product in about 40% yield. An equivalent weight determination was made as follows: found, 298; calc'd., 299.

The purified compound may be made soluble by adding a salt such as sodium bicarbonate and the resulting product has very low toxicity, the $LD_{50}$ on rats being about 200 mg. per kg.

The antibacterial effect of the soluble purified product was tested in the following manner: Disks were impregnated with the product and impregnated disks were placed on the surface of blood agar plates which had previously been seeded with the appropriate organism. Each disk contained about 0.175 mg. of the product and the plates were incubated at 37° C. for twenty hours. The zone of inhibition, that is, the zone about the impregnated disk in which no growth was seen after incubation, reflected the antibacterial effect. The following table shows the results of these tests:

| Organism: | Zone of inhibition (mm.) |
| --- | --- |
| Proteus | 17 |
| Hemo. *Staph. aureus* coag. neg. | 16 |
| Hemo. *Staph. aureus* coag. neg. | 15 |
| Hemo. *Staph. aureus* coag. pos. | 15 |
| Hemo. *Staph. aureus* coag. pos. | 8 |
| *E. coli* | 18 |
| *E. coli* | 16 |
| Proteus | 15 |
| Proteus | 8 |
| *E. coli* | 16 |
| Achromobactor | 13 |

When other halogenated or substituted phenols are used, the reaction proceeds in substantially the same way. In some instances, the hydrochloric acid reacts with excess N-methyl glycine to form soluble salts which are difficult to separate, but for many applications, this is unimportant.

EXAMPLE 2

*The N-methyl glycine Mannich derivative of 6-chloro thymol*

6-chloro thymol, 3.7 g. (.02 mole) was dissolved in 10 cc. of absolute alcohol and added to 43 g. of an aqueous N-methyl glycine solution containing about 13% of the sodium salt of N-methyl glycine. This was chilled and 1.2 g. (.04 mole) of paraformaldehyde was added. The mixture was then allowed to stand at room temperature for about 30 minutes. It was then refluxed for four hours using a glascol electric heater; the mixture became homogeneous soon after refluxing started. At the end of the reaction period, the contents of the flask were allowed to cool and diluted HCl was added slowly until the pH of the solution reached about 2.0, or until no further white solid appeared to separate. It was then washed with cold water and filtered, giving 4.7 of crude product, which softened at 70° and melted (with flowing) at about 145–150°. Recrystallization from benzene gave a product melting at 155–157°.

The reactions are indicated by the following equations:

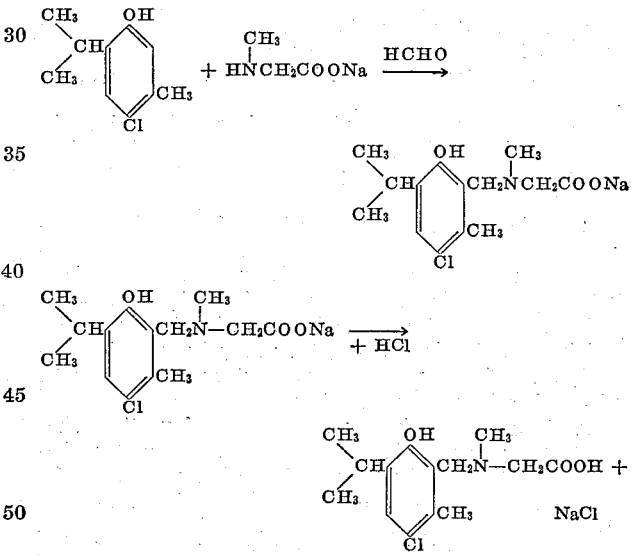

The other N-methyl glycine derivatives embraced by the present invention may be formed in the same manner.

In each of the examples set forth above, the method of preparing the mono-Manniched compound was set forth. If desired, the di-Manniched derivative may be prepared (where both the ortho and para positions on the phenolic nucleus are open) where a sufficient excess of Mannich reagent is used.

The resulting products have strong antibiotic and antiseptic effects without allergic side effects. The purified products can be used in various ways, i.e., orally and by injection as antibiotics and in purified or crude form as additives to detergents, in soaps and in resins or gums for impregnation.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all the changes which come within the meaning and range of equivalency of the claim are therefore intended to be embraced therein.

What is claimed and desired to be secured by United States Letters Patent is:
A compound of the formula
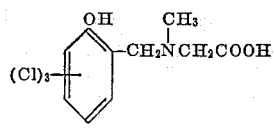
References Cited by the Examiner
UNITED STATES PATENTS
2,717,263   9/1955   McKinney et al. _____ 260—471
LORRAINE A. WEINBERGER, *Primary Examiner.*
CHARLES B. PARKER, LEON ZITVER, *Examiners.*